Jan. 5, 1960 W. R. CREAMER 2,919,463
LOCATING MEANS FOR FOOTWEAR MOLDING EQUIPMENT
Filed Feb. 17, 1958

Inventor
William R. Creamer
by Roberts, Cushman & Grover
Attys

United States Patent Office 2,919,463
Patented Jan. 5, 1960

2,919,463

LOCATING MEANS FOR FOOTWEAR MOLDING EQUIPMENT

William R. Creamer, Holliston, Mass., assignor to International Vulcanizing Corporation, Boston, Mass., a corporation of Massachusetts Application February 17, 1958, Serial No. 715,702

3 Claims. (Cl. 18—5)

This invention relates to apparatus for making shoes and more especially to apparatus for molding and forming bottoms from compositions of rubber or plastic for attachment to the lasting marging of an upper mounted on a last, as shown in the pending application of Henry Hardy, Serial No. 404,608, filed January 18, 1954, now Patent No. 2,878,523.

As therein shown, there is a bottom mold and a support for holding a last in registration with the opening at the top of the mold so that the bottom forming compounds placed in the mold will be applied in perfect conformity to the bottom of the upper. The mold and last must be changed frequently for making shoes of different size and each time a change is made the alignment of the last with the bottom of the mold opening must be reestablished by trial and error, that is, by adjusting a last as nearly as possible by sight, then attaching a bottom to an upper and finally cutting the shoe up after it is completed to see whether the walls and bottom are of the desired thickness and uniformity. Such adjustment requires several trials before the correct position of the last is effected so that a good deal of time and material is wasted.

The principal objects of this invention are to provide means for duplicating the position of the last, after its position has been once perfected, each time it is mounted on the support for use and to provide a method for setting unp the duplicating means for use.

As herein illustrated, there is a support mounting a last for registration with the mold, means for fastening the last to the support for adjustment relative to the mold, positioning means associated with the last and mold which are engageable to hold the bottom of the last in a predetermined position with respect to the mold preparatory to locking the fastening means with the mold in the adjusted position and means for locking the fastening means. The engageable means are locating pins which extend laterally from the sides of the last at the toe and heel for engagement with recesses in the mold and by said engagement to hold the bottom of the last at a predetermined position with respect to the mold cavity until the last can be locked in place. The locating pins are removable after the last has been locked on the support.

In accordance with the method the mold is initially brought into the desired position with reference to the mold by trial and error, clamped in this position and then aligned apertures are formed in the mold and last for receiving positioning pins which, by engagement with the aligned apertures, will hold the last at said predetermined position. Each time that it is necessary to make a change in lasts the last and mold may be brought into proper registration by moving them into positions in which the openings are in registration, disposing the locating pins therein and then while the last is held in position locking it to a support, whereupon the locating pins may be removed and the last will be in readiness for use.

The invention will now be described in greater detail with reference to the accompanying drawings wherein.

Figure 1:
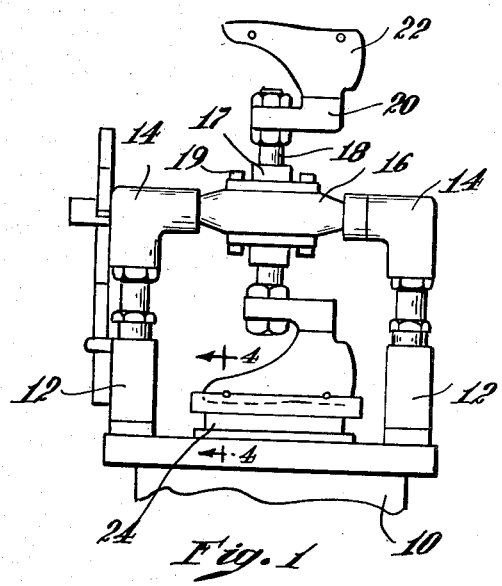
Fig. 1 is a side elevation of apparatus for attaching bottoms to uppers by means of molding and fusion.
Figure 4:
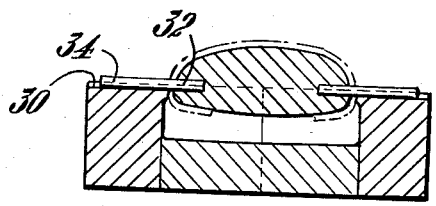
Figure 5:
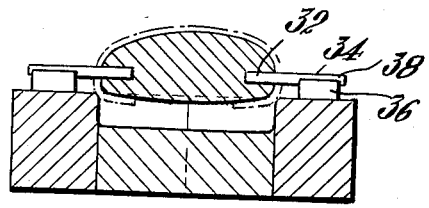

Fig. 4 is a transverse section taken on the line 4—4 of Fig. 1, showing the locating pins supporting the last on the mold with the lower part of the last within the mold cavity and the upper in dot and dash lines; and Fig. 5 is a section similar to Fig. 4, showing the locating pins and means on the mold for supporting them at such an elevation with respect to the mold that the bottom of the last is substantially at the level of the rim of the mold cavity.

Referring to the drawings, Fig. 1, there is shown a base 10 mounting a pair of posts 12, which have at their upper ends aligned bearings 14, in which are journaled for rotation the opposite ends of a shaft 16. The shaft has diametrically opposed ball socket assemblies 17, in each of which is mounted a ball from which extends an arm 18. The assemblies 17 are fastened by bolts 19 to the shaft and by tightening the bolts the arms may be locked in any desired position. Brackets 20 are adjustably mounted on the outer ends of the arms and may be locked at any given radial distance from the axis of the shaft by lock nuts 21. Each bracket is adapted to have a last 22 fastened thereto. By turning the shaft 16 each last may be brought into a position in registration with a mold 24 resting on the base 10, for attachment of a bottom thereto, while the other last is held in an elevated position for assembly of an upper thereon preparatory to the bottom attaching operation.

Figure 3:
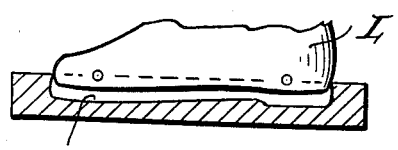
Fig. 3 is a vertical section longitudinally of the mold, showing the lower part of a last supported at the top of the mold cavity.

The mold 24 is comprised of two parts 26, engageable along a center line extending from toe to heel, which collectively provide a mold cavity 28 for receiving a bottom forming compound, for molding and attachment to the bottom of an upper on a last L. As shown in Fig. 3, the last when in registration with the mold must be supported in perfect conformity with the rim of the opening at the top of the cavity so as to insure uniform wall thickness and it must be transversely and longitudinally level if the bottom is to be of uniform thickness.

Heretofore each shoe manufacturer has had to adjust the last by adjustment of its supporting bracket 20 by trial and error, that is, to line up the bottom of the last with the mold cavity by sight, fix it in position and then make a shoe. The shoe was then cut up and the wall and bottom thicknesses examined to see if they were uniform and if not the last was readjusted and another shoe made. By several trials the correct position of the last was finally determined and the bracket was locked. This was a waste of time and material because the lasts had to be replaced frequently, for different size shoes, and each time a new last and mold were mounted the same procedure had to be carried out to bring the last into perfect conformity with the mold cavity.

Figure 2:
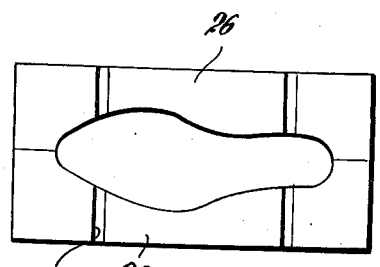
Fig. 2 is a plan view of the bottom mold.

According to this invention the positioning of the last in perfect conformity with the mold cavity is carried out just once by means of the cut and try method, preferably at the place of manufacture of the machine, lasts and molds. When a last of a given size has been properly located and secured in place by locking the supporting arm 18 and bracket 20, registering openings 30 and 32 are made respectively, in the upper surface of the mold and the wall of the last, as shown in Figs. 3 and 4, for receiving locating pins 34. The holes may be made in the mold and last by any suitable means and preferably, as shown in Fig. 2, are made near the toe and heel.

Each last and mold made for a given apparatus is prepared as above described so that when the shoe manufacturer receives a machine and a set of matched lasts and molds together with locating pins, he can set up his machine for use quickly and easily. Thus, when the manufacturer wants to make a shoe of a given size he selects the corresponding size last and mold, mounts the mold on the base 10, places the positioning pins 34 in the holes in the last and then sets the last over the mold cavity with the outer ends of the positioning pins resting in the openings 30. While in this position he locks the bracket 20 by tightening the nuts 21 so that the last cannot change position, whereupon the pins are withdrawn and the apparatus is ready for use. Such a change can be made rapidly by the operator without requiring the assistance of a shop mechanic and assures perfectly formed shoes.

In Figs. 3 and 4, the bottom of the last L, as shown, is situated below the rim of the mold cavity however in some cases, as shown in Fig. 5, it is desirable to have the bottom of the last substantially at the level of the rim of the mold cavity. To do this it is necessary to add to the top of the mold, for example by attaching blocks 36 thereto for supporting the positioning pins 34. Each block 36 will, of course, have an opening 38 therein in registration with the opening 32 in the last.

It should be understood that the present disclosure is for the purpose of illustration only and that this invention includes all modifications and equivalents which fall within the scope of the appended claims.

I claim:

1. Apparatus for attaching a moldable body to the bottom of an upper assembled on a last, comprising a base, a mold body mounted on the base, said mold body containing an open top cavity for receiving a moldable composition, a rotatable support spaced from the open top of the mold, means mounting the support on the base for movement perpendicular to the plane of the open top of the mold, an arm, means adjustably connecting the upper end of the arm to the support so that its lower end may be swung angularly with respect to the open top of the mold, a bracket, means adjustably connecting the bracket to the lower end of the arm for movement axially thereof, a last carried by said bracket and having a bottom for disposition with an upper assembled thereon in engagement with the mouth of the mold, the mouth of the mold being larger than the bottom of the last to permit entry of the last bottom into the mold to adjust the last with respect thereto said last containing pairs of laterally spaced holes at its opposite sides for removably receiving locating pins, and pairs of locating pins adapted to be inserted in the holes and to rest on the sides of the mold, whereby the naked last may be disposed with its bottom level with respect to the bottom of the mold and uniformly spaced from its sides, by an amount sufficient to accommodate the upper when the latter is assembled thereon without damage to the upper, by adjustment of the angular position of the arm and the axial position of the bracket, and may be rigidly clamped in said position, and to be thereafter removed prior to the attaching operation to permit application of an upper assembly to the last for attachment of a bottom thereto.

2. Apparatus according to claim 1, wherein the mold has pairs of recesses at its sides for receiving the outer ends of the locating pins when the last is in said position of adjustment with the bottom of the last below the open top.

3. The combination of a last for disposition adjacent the mouth of an open top mold to hold an upper assembled thereon in a position for attachment of a bottom, said last having positioning holes in its sides at the forepart and heel end and removable locating pins adapted to be inserted into said holes, leaving portions extending laterally from the sides of the last for engagement with the mold, to hold the last with its bottom in a predetermined position with respect to the mold while the last is fixed in said position.

References Cited in the file of this patent

UNITED STATES PATENTS

| 2,178,774 | Bogoslowsky | Nov. 7, 1939 |
| 2,361,348 | Dickson et al. | Oct. 24, 1944 |

FOREIGN PATENTS

| 763,847 | Great Britain | Dec. 19, 1956 |